No. 610,928. Patented Sept. 20, 1898.
E. THOMSON.
ELECTROSTATIC MEASURING INSTRUMENT.
(Application filed Mar. 27, 1897.)
(No Model.) 2 Sheets—Sheet 1.

WITNESSES. INVENTOR.

No. 610,928. Patented Sept. 20, 1898.
E. THOMSON.
ELECTROSTATIC MEASURING INSTRUMENT.
(Application filed Mar. 27, 1897.)
(No Model.) 2 Sheets—Sheet 2.

WITNESSES
INVENTOR
Elihu Thomson
By Geo. R. Blodgett
Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

ELECTROSTATIC MEASURING INSTRUMENT.

SPECIFICATION forming part of Letters Patent No. 610,928, dated September 20, 1898.

Application filed March 27, 1897. Serial No. 629,467. (No model.)

*To all whom it may concern:*

Be it known that I, ELIHU THOMSON, a citizen of the United States, residing at Swampscott, in the county of Essex, State of Massachusetts, have invented certain new and useful Improvements in Electrostatic Measuring Instruments, (Case No. 547,) of which the following is a specification.

The present invention relates to electrostatic measuring instruments designed to measure high potentials. It relates more particularly to instruments employed on alternating-current circuits and is adapted to indicate as high voltages as twenty thousand volts, for example.

The invention has for one of its objects to provide a shield for the operating parts of the instrument, which is located between said operating parts and the surrounding case, thereby preventing the static condition of the case from affecting the indications of the instrument.

The invention also provides certain damping devices for use in an electrostatic indicating instrument.

The invention also relates to certain novel features in the construction to be more fully described and claimed hereinafter.

Figure 1:
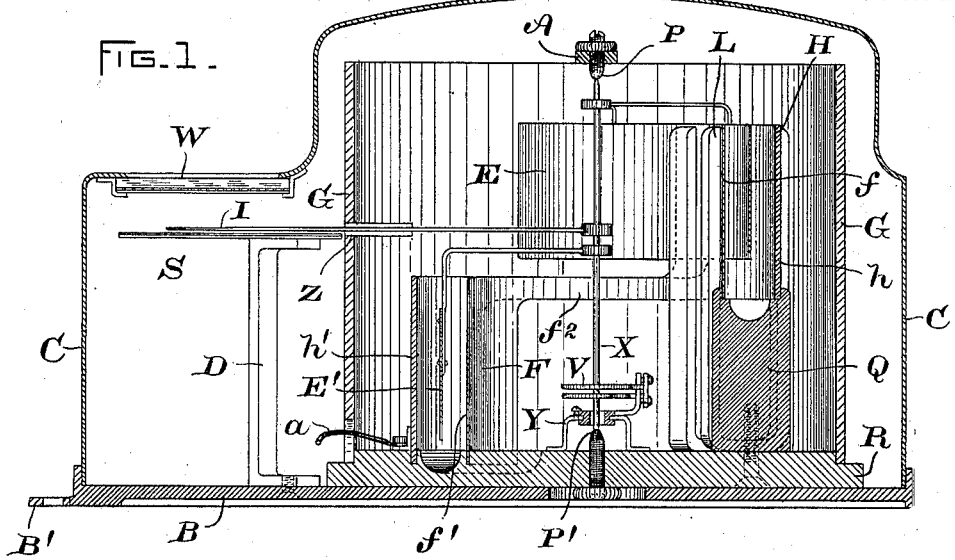
Figure 2:
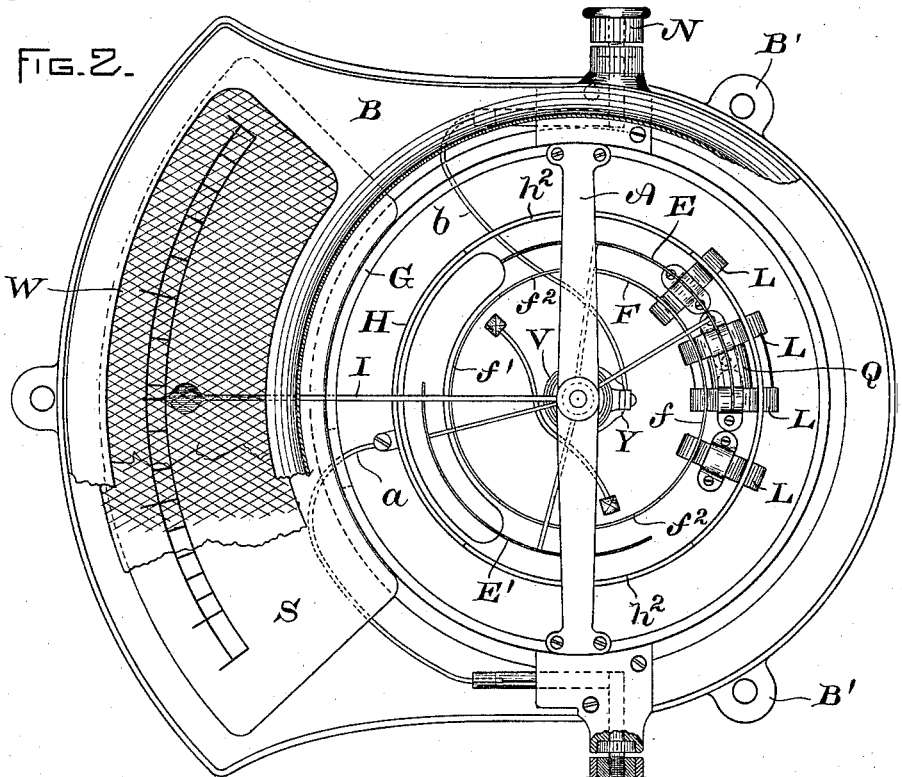
Figure 3:
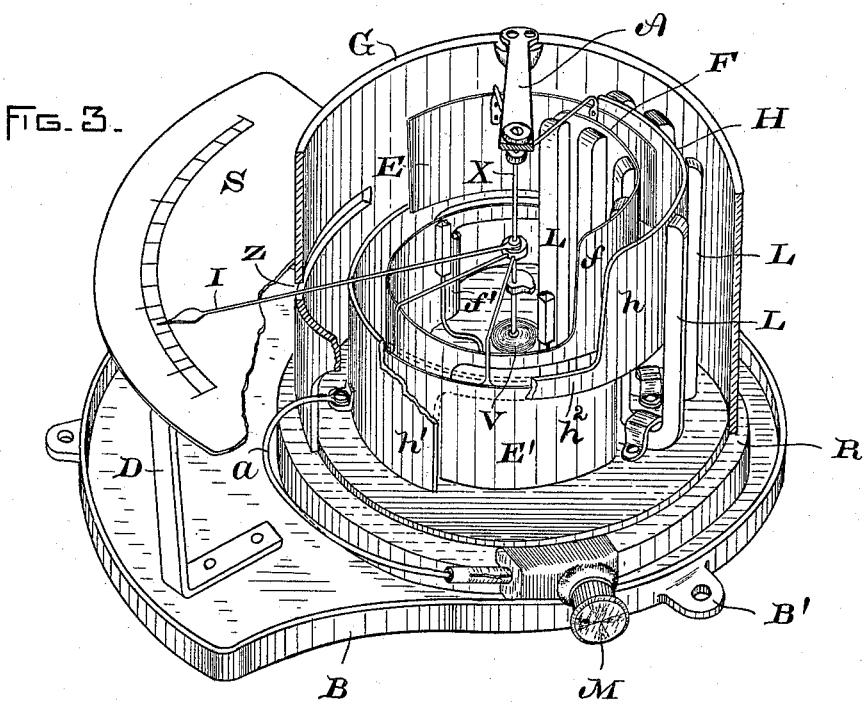
Figure 4:
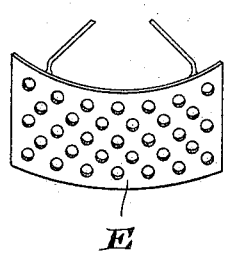

In the accompanying drawings, attached to and made a part of this specification, Figure 1 is a sectional view of an instrument made in accordance with my invention. Fig. 2 is a plan view of the instrument with the surrounding casing removed. Fig. 3 is an isometric view with the casing removed, and Fig. 4 is a modification of one of the vanes.

The base B sustains the several parts of the instrument and is provided with lugs B' for securing it to a support. Mounted upon the base is a circular auxiliary base R, of insulating material, having a shoulder near its outer periphery, forming a support for the circular metal shield G. The shield may be constructed of perforated metal or wire-gauze or any conducting material the structure of which virtually surrounds the working parts of the instrument. Extending across the top of the shield is a metal piece A, in which is mounted a jewel P, forming the upper bearing of the shaft X, and in the insulating-base is mounted a jewel $p'$, forming the lower bearing.

Mounted on the insulating-base R and concentric with the shaft X is a stationary electrostatic inductor H, having an upwardly-extending part or quadrant $h$, mounted in a support Q, and a downwardly-extending part or quadrant $h'$, mounted in a groove in the base, the two being connected by strips $h^2$. Situated within the inductor H and concentric therewith is a second electrostatic inductor F, having an upwardly-extending part or quadrant $f$ and a downwardly-extending part or quadrant $f'$, the two parts being connected by strips $f^2$. Both inductors are supported in a similar manner and corresponding parts are placed opposite. The inductors F and H are electrically connected, and a wire extends therefrom to binding-post M. This wire is sustained in air and is sufficiently insulated from all parts of the instrument to stand the maximum voltage without leaking.

Mounted on the shaft X for oscillating movement between the stationary inductors are thin sheets or vanes of aluminium E E', made in the form of a segment of a cylinder, vane E working between the upwardly-extending parts $h\ f$ and vane E' between the downwardly-extending parts $h'\ f'$ of the inductors. These vanes or sheets may, if desired, be perforated, as shown in Fig. 4, to reduce the weight without materially decreasing the electrostatic effect between the vanes and the surrounding electrostatic inductors. The space between the vanes E and E' and the outer and inner inductors F and H is made sufficient to insulate for the potential at which the instrument is to be used.

Secured to the insulating-base is a frame Y, surrounding the shaft and supporting the outer ends of the spiral springs V, the inner ends of which are attached to the shaft. The tension of the spring is arranged to return the needle I to zero when no deflecting force exists. Connecting the binding-posts N and the frame Y is a wire $b$, which through the shaft and springs connects the vanes E and E' with the binding-post. The shield G is also in electrical connection with the binding-post N.

A series of magnets L L, preferably permanent, is arranged at intervals with their free poles extending upward, so that vane E in moving will cut the lines of force. This induces current in the vane and prevents too violent oscillations of the needle when actuated by the electrostatic field or by the springs. The magnets L L need not be insulated from the inductors F and H, but can be carried or guided by them or the magnets may serve in part to support the inductors.

A vibrating needle I is mounted on the shaft X and extends through a slot Z in the shield G and works over a scale-plate S, which is supported by insulating-brackets D. When the vanes E E', needle I, and shield G are electrified, the scale becomes of the same polarity.

Surrounding the instrument is a case C, provided with a window W, closed by glass or other transparent substance. The window is preferably covered on one or both sides with a fine wire-netting electrically connected to the case C and having an open mesh, so as not to obstruct the view of the needle and scale. The netting may be made in a variety of ways—for example, it may be made of fine wire or of thin strips of semiconducting material more or less perforated. This netting or conducting meshwork prevents any electrification of the glass due to any local action having any effect upon the needle by distributing any electrostatic charges or inductively binding them so that they have no value.

The operation of the instrument is as follows: The stationary inductors H and F being connected to one side of the high potential system through binding-post M and wire $a$ and the moving vanes E E' and shield G being connected by wire $b$ to the binding-post N and opposite side of the system, the electrostatic condition of the circuit at any instant is communicated to the moving vanes and inductors, and as the vanes at the start are displaced relatively to the stationary inductors the electrification of one or both of them causes a tendency of the vanes to move to a position where their surfaces are directly and completely opposite to the inductors, this tendency being opposed by spiral springs V. During the movement of vane E it passes through the magnetic fields of the damping-magnets L, and eddy-currents are set up in the same, which tend to check its too violent motion. The inclosing cylindrical shield G cuts off all extraneous inductive actions which might be exerted between the moving vanes and the surrounding case to an extent to produce errors in the readings. The shield G constitutes an electrostatic diaphragm, and its connection with the binding-post, to which the moving vanes are connected, insures its always having a definite electrical relation to the vanes. For example, if by accident the surrounding case should be in leakage connection with either terminal or should become electrified to a greater or less extent it might without the shield act to deflect the needle from its proper reading.

What I claim as new, and desire to secure by Letters Patent of the United States, is—

1. In a static measuring and indicating instrument, the combination of stationary inductors and a vibrating needle, the vanes of the needle being segments of a cylinder, with a permanent magnet whose lines of force cross the path of one of the vanes of the needle substantially at right angles thereto.

2. In a static measuring and indicating instrument, the combination of fixed inductors and a vibrating needle having vanes in close proximity to said inductors, with an insulating dielectric between said vanes and inductors, and a permanent magnet whose lines of force cross the path of one of the vanes of the vibrating needle.

3. In a static measuring and indicating instrument, the combination of a vibrating needle having vanes and fixed inductors in close proximity to said vanes, the vanes and inductors being cylindrical in form, with an insulating dielectric between the vanes of said needle and said inductors, and permanent magnets so arranged that their arms are upon opposite sides of the path of one of the vanes.

4. In a static indicating instrument, the combination of outer and inner stationary inductors having upper and lower quadrants, as described, with a needle having vanes circular in outline, which move in the spaces between the different quadrants of the inductor, as described.

5. In a measuring and indicating instrument, the combination of a vibrating needle and stationary inductors separated from each other by an insulating medium, with a shield inclosing the moving parts of the instrument.

6. In a measuring and indicating instrument, the combination of a vibrating needle and stationary inductors separated from each other by an air-space, and a metal shield inclosing the moving parts of the instrument to protect them from extraneous inductive actions.

7. In a static measuring and indicating instrument, the combination of fixed and movable bodies in inductive relation to each other, a case surrounding the instrument, and a shield mounted between the surrounding case and the working parts of the instrument, connected to one side of the system with which the instrument is in circuit.

8. In a static measuring and indicating instrument, the combination of a vibrating needle, vanes for moving the needle, stationary inductors separated from each other by an insulating medium, and a cylindrical metal shield surrounding the operating parts of the instrument to prevent extraneous inductive actions from affecting the readings.

9. In a static measuring and indicating instrument, the combination of a vibrating needle and stationary inductors separated from each other by an insulating medium, a scale over which the needle moves, a case surrounding the instrument having a glass-covered opening, and means preventing any electrification of the glass from affecting the indications of the instrument.

10. In a static measuring and indicating instrument, the combination of a vibrating needle, and stationary inductors separated from each other by an insulating medium, a scale over which the needle moves, a case surrounding the instrument, having a glass-covered opening, and a metal screen covering the glass preventing any local electrification from affecting the indications of the instrument.

11. In a static measuring and indicating instrument, the combination of a vibrating needle, vanes for moving the needle, stationary inductors acting upon the vanes, a scale-plate over which the needle moves, a case surrounding the instrument having a glass-covered opening, and a wire screen electrically connected to the case located over the needle.

12. In a static measuring and indicating instrument, the combination of a stationary inductor mounted concentric with the shaft of the instrument, and having upwardly and downwardly extending quadrants, a second inductor similarly shaped mounted within the first, and vanes mounted on the shaft in such manner that one of them is affected by the upwardly-extending quadrant and the other by the downwardly-extending quadrant of both of the inductors.

In witness whereof I have hereunto set my hand this 25th day of March, 1897.

ELIHU THOMSON.

Witnesses:
JOHN W. GIBBONEY,
HENRY O. WESTENDARP.